(12) United States Patent
Sobel et al.

(10) Patent No.: US 6,349,311 B1
(45) Date of Patent: Feb. 19, 2002

(54) STORAGE OF REVERSE DELTA UPDATES

(75) Inventors: William E. Sobel, Cypress; Carey S. Nachenberg, Northridge, both of CA (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 09/241,794

(22) Filed: Feb. 1, 1999

(51) Int. Cl.[7] .......................... G06F 12/00; G06F 17/30
(52) U.S. Cl. ...................................... 707/203
(58) Field of Search ............................. 707/202, 203, 707/204; 714/15, 16, 19, 20

(56) References Cited

U.S. PATENT DOCUMENTS 5,455,946 A * 10/1995 Mohan et al. ............... 395/600
5,574,906 A * 11/1996 Morris ........................ 395/601
5,745,906 A * 4/1998 Squibb ........................ 707/203
5,873,097 A * 2/1999 Harris et al. ................ 707/203

* cited by examiner

*Primary Examiner*—John Breene
*Assistant Examiner*—Susan Rayyan
(74) *Attorney, Agent, or Firm*—Fenwick & West LLP

(57) ABSTRACT

A computer readable file of a first state (3.0) is updated to a second state (3.2) through the use of an incremental update (112) which provides the information necessary to construct the file of the second version (3.2) from a file of the first version (3.2). In order to allow for future access to the first version (3.0), without maintaining a copy of the file of the first version (3.0), a back-update file (206) is created. The back-update file (206) provides the information necessary to construct a file of the first state (3.0) from a file of the second state (3.2).

14 Claims, 2 Drawing Sheets

Fig. 1
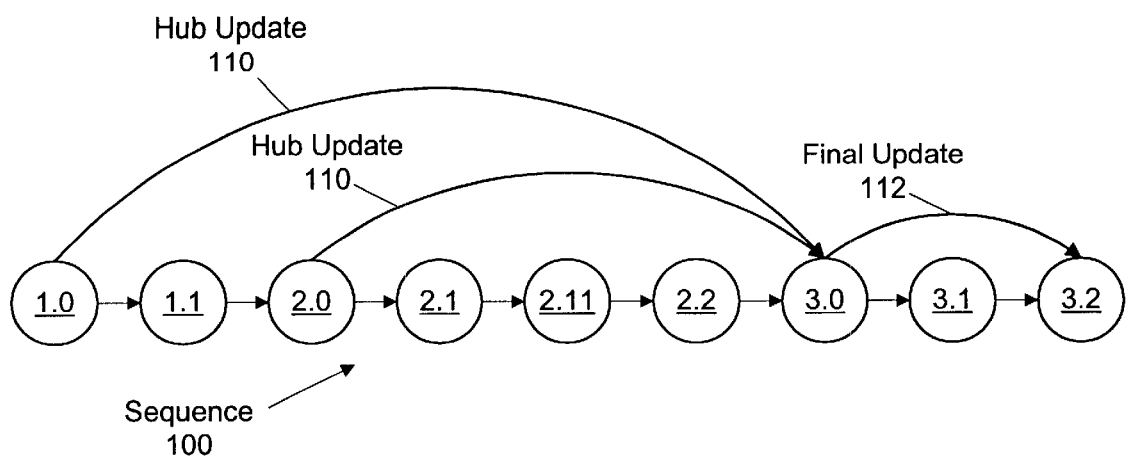
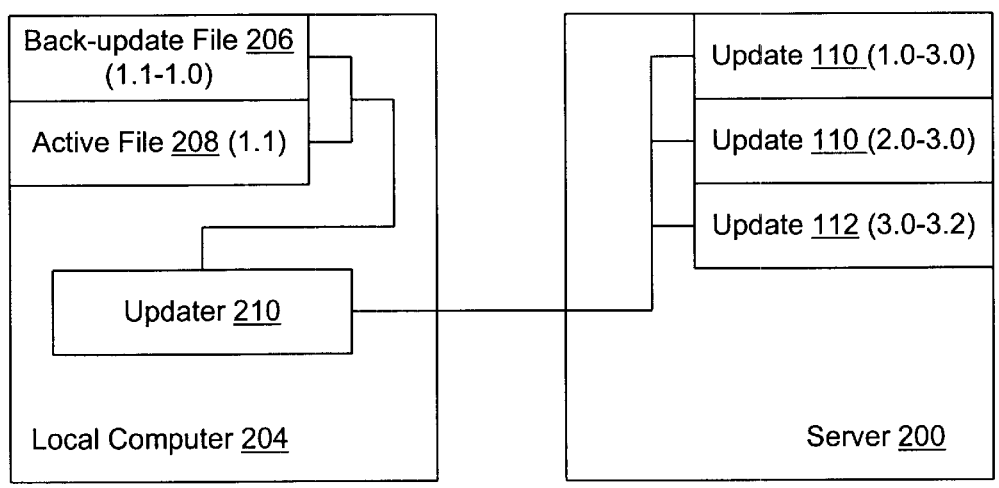
Fig. 2

STORAGE OF REVERSE DELTA UPDATES

REFERENCE TO RELATED APPLICATION

This application is related to co-pending, and commonly assigned, U.S. patent applications Ser. No. 09/047,949 now issued U.S. Pat. No. 6,052,531 for "Multi-Tiered Incremental Software Updating", filed on Mar. 25, 1998, and Ser. No. 09/089,930 now U.S. Pat. No. 6,167,407 for "Backtracked Delta Updating", filed on Jun. 3, 1998.

FIELD OF INVENTION

This invention pertains to the field of computer software updating. More specifically, this invention pertains to a system and method for generating and using a stored back-patch to undo the effects of a forward patching.

BACKGROUND OF THE INVENTION

Some computer software publishers update their software applications (computer programs and data files associated with the programs) frequently. These updates often add new features to the applications as well as remove existing bugs. Several methods are commonly used to update software applications. The simplest of these is to distribute one entire software application to replace an older one. This full update method is simple, but expensive and inconvenient. Typically the software application is distributed on some type of removable media, such as floppy disks or CD-ROMs, which are costly to produce and distribute. The time an end user must wait for the removable medium to arrive and the time it takes for the software application to install itself on a computer system are inconvenient. This inconvenience is compounded where updates occur frequently.

Because of the large size of many software applications it is generally not feasible to distribute full updates over computer networks, such as the Internet. When full updates of larger applications are distributed over a network, they often cause such high loads on servers that other users suffer slow-downs on the network, and the servers have trouble meeting the demands.

In order to bypass many of the problems associated with this type of software updating, some software publishers distribute incremental updates. These incremental updates do not contain entire software applications, but rather they contain that information which is necessary to transform a particular version of a software application to a newer version. As used herein, the word "version" indicates a file or application of a specified state. Among the methods available to perform such incremental software updating is binary patching, performed by programs such as RTPatch, published by Pocket Soft, Inc. A binary patcher changes those binary bits of a computer readable file which are different in a newer version. A binary patcher needs, in addition to the old file, a data file which includes the differences between the two versions. Because most software updates involve changes to only a small portion of a software application, these incremental update data files can be relatively small. The data files distributed for a binary patch incremental update are often less than 1% of the size of a full update, taking advantage of the large amount of redundancy between the two versions.

The use of incremental update methods allows for smaller updates which can be distributed by means which are not conducive to the distribution of full updates, such as distribution over the Internet. The smaller incremental updates also make distribution by floppy disk more feasible where a full update would have required many disks, and an incremental update may require only one.

However, conventional incremental update methods introduce another problem: an incremental update is specifically useful for updating only one particular version of a software application to another particular version. When updates occur frequently, as with virus protection software applications, end users may update from an arbitrarily old version to the newest version, skipping over several previously released versions. An incremental update for the newest version of a software application will generally update only from the most recent version, however. To update from an arbitrarily old version to the most recent version with incremental updates, a user often needs to acquire and apply a number of successive incremental updates.

One solution to this problem has been for software publishers to group a number of incremental update files together into one distribution. Each necessary incremental update is applied, one at a time, to update to the newest version. However, the number of incremental updates may be large, due to the fact that a grouping generally covers a large number of possible versions. The benefits of smaller distributed update files begin to disappear, as the size of the grouped-together incremental updates grows. Lowering the number of update files available increases the amount of data the average user must acquire for an update, since the user will not need all of the incremental updates in a grouping. This method of updating applications can also be cumbersome, as a series of incremental updates needs to be selected from the group and applied to the software application one after another.

Another solution to the problem of incremental update version-specificity has been to create many unique incremental update files which each transform a different previous version to the most current version. Then, only one incremental update is needed by any user. However, where updates are very frequent, this scheme results in a large number of incremental update files to produce, store and maintain for users. In the case of publishers, such as virus-protection software publishers, who might update their applications as often as daily, this can quickly become untenable. The number of files which must be made available with this scheme grows quickly, and makes the mirroring of incremental updates on a local server difficult. For example, in a case where a virus protection software publisher makes new virus definition files available daily, each year's worth of updates will require approximately 365 incremental update files.

One alternative to the methods described above is the use of "push" technology, in which a server maintains a database of what version each user has. The server then sends the necessary updates to each user, as they become available. This system requires "smart" servers, however, to monitor user configurations, to determine what each user needs, and to send the appropriate update information. This results in a server-intensive system which can cause a drain on server resources comparable to that experienced in the full update scheme, when many users are simultaneously requesting full updates. It is preferable to use a system which allows update files to be stored on a "dumb" server which simply provides specifically requested files.

In an alternative which addresses these problems, at least one of a sequence of versions of a computer readable file is designated a "hub" version. Hub updates are made available on a server for updating any previously published hub version to the most recently published hub version. A final update is also made available on the server for updating the most recently published hub version to the current version. A previously published hub version of the file can be used with the two updates to produce a file of the current version. The first update is used to produce the most recent hub version, and the second update is used to produce the current version.

When such an update is carried out, an intermediate version of the file, the most recent hub version, is produced. The file of this hub version is retained locally subsequent to the current version being constructed. The current version is used as an active version, while the most recent hub version is an archive version. The next time an update is carried out, the archive version (being a hub version) can be used with just the two update files to update the active version to the new current version. If there are few hubs, the number of update patches which must be made available is small. For example, if a virus protection software publisher makes new virus definition files available daily, the publisher may designate as hubs those versions which coincide with the first day of each month. Over a year's worth of updates can be stored on the publisher's server in the form of thirteen hub updates and one final update. Unlike the case in which large numbers of incremental updates are grouped together to lower the number of files to be maintained, each of the hub updates and the final update can be as small as a typical incremental update. Also, dumb servers can be used to store the updates.

Retaining an archive version of a file or application locally, however, can impose a significant burden on the end user. Because the archive version which is retained will generally be of comparable size to the final version, this method requires on the order of twice as much local storage space for each end user. Conventional compression of the archive version results in some storage space savings, but the storage requirements for some compressed archive versions are still nearly as large as an uncompressed archive version. It would be useful to retain only that information from the archive version which is necessary.

SUMMARY OF THE INVENTION

In one embodiment of the present invention, a file of a first state (3.0) is updated to a second state (3.2) through the use of an incremental update (112) which provides the information necessary to construct the file of the second version (3.2) from a file of the first version (3.2). In order to allow for future access to the first version (3.0), without maintaining a copy of the file of the first version (3.0), a back-update file (206) is created. The back-update file (206) provides the information necessary to construct a file of the first state (3.0) from a file of the second state (3.2). After the back-update file (206) has been created and stored, the file of the first version (3.0) can be deleted.

BRIEF DESCRIPTION OF THE DRAWINGS

FIG. 1 is an illustration of a sequence 100 of file versions and the incremental updates 110,112 for transforming them.

FIG. 2 is an illustration of one embodiment of the present invention.

DETAILED DESCRIPTION OF THE PREFERRED EMBODIMENTS

Figure 3:
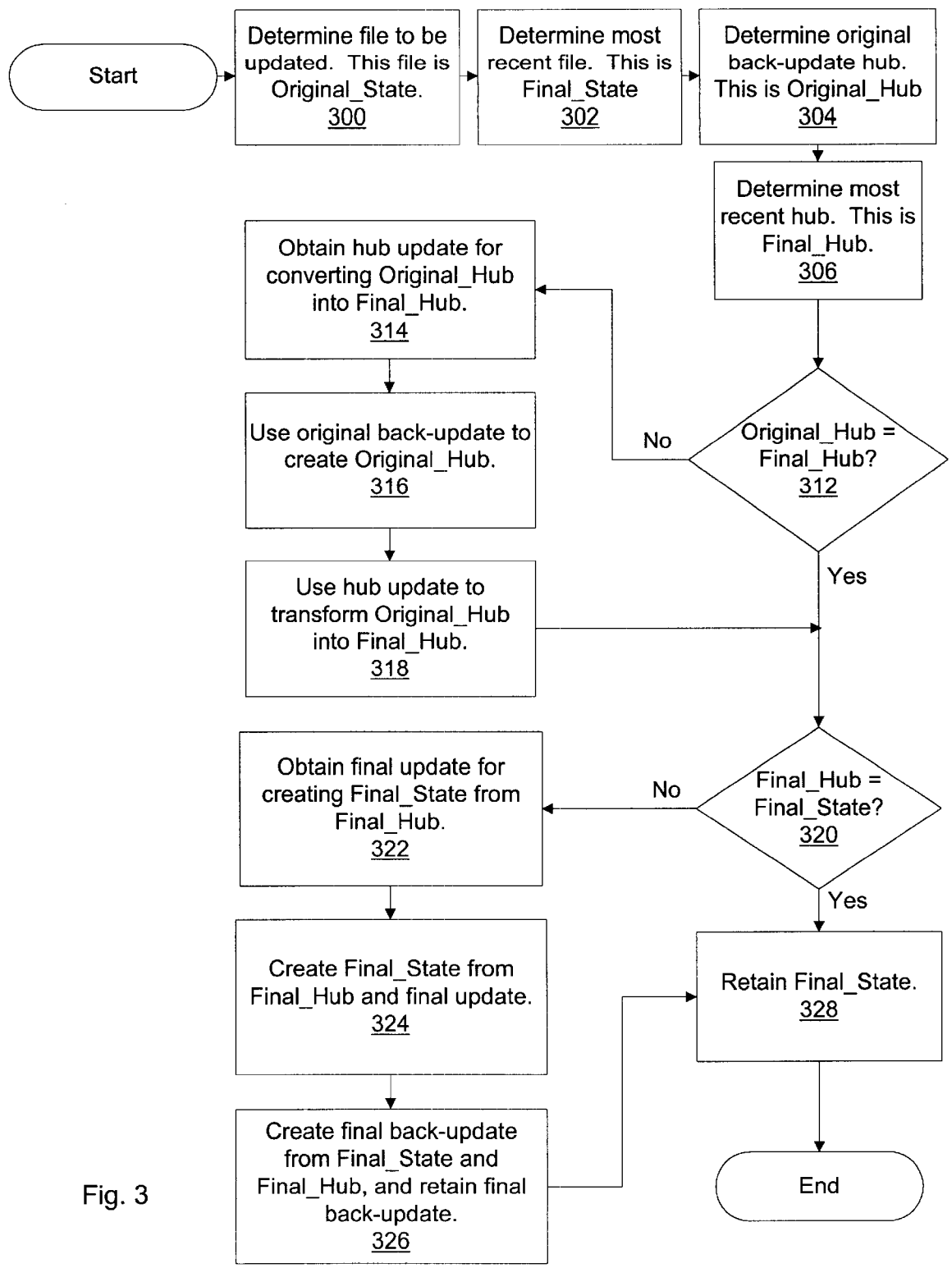
FIG. 3 is a flowchart illustrating the operation of one embodiment of the present invention.

Referring now to FIG. 1, a sequence 100 of states 1.0–3.2 of a computer readable file is shown. Each numbered state corresponds to a later state of the file than states with lower numerical designations. Those versions with numerical designations ending in "0.0" correspond to hub versions. In one embodiment, hub versions are major versions and non-hub versions are minor versions. The designation of hub versions does not need to be based on any such distinction, however. In the illustrative embodiment, the computer readable file is a virus definition file used by a virus detection program. As used herein, the term computer readable file encompasses one or more associated files. A computer readable file can be an executable file, a graphics file, an audio file, a data file, a complete software application comprising files of different types, or any other type of computer readable file which can be accessed and updated by a computer.

In FIG. 1, two hub incremental updates 110 are each used to construct a hub version from an earlier hub version. One hub incremental update 110 connects hub state 1.0 to hub state 3.0, and the other connects hub state 2.0 to hub state 3.0. The hub incremental update 110 shown connecting hub states 1.0 and 3.0 is an incremental update file which can be used to construct a version 3.0 file from a version 1.0 file. Final incremental update 112 is an incremental update file which can be used to construct a file of the most recent version (in this case 3.2) from a file of the most recent hub version (in this case 3.0).

Referring now to FIG. 2, local computer 204 includes active file 208, which is the 0o most recent version of the computer readable file available on computer 204. The version of active file 208 is, in this example, version 1.1. Active file 208 might be used by a program such as a virus scanner program. Local computer 204 also includes back-update file 206, which is an incremental update file which can be used to construct a file of hub state 1.0 from a file of state 1.1. Hub state 1.0 precedes, in sequence 100, state 1.1. In an exemplary embodiment of the present invention, back-update file 206 converts active file 208 to the latest hub version which is not later in sequence 100 than active file 208. When active file 208 is a hub version, no back-update file 206 is necessary.

Updater 210, a program local to computer 204, is used to update active file 208.

Provided with an incremental update and an old version, updater 210 can create an updated version.

A software publisher makes several hub incremental updates 110 and one final incremental update 112 available on server 200. Server 200 transmits an incremental update file to local computer 204 in response to a request for the file. Server 200 can be a file server on a local area network (LAN), a file server on a wide area network (WAN), a File Transfer Protocol (FTP) server, a Hypertext Transfer Protocol (HTTP) server, or a Network News Transfer Protocol (NNTP) server. Additionally, server 200 can be a removable magnetic or optical storage medium, or any other type of storage device capable of supplying computer readable files to local computer 204 in response to a request for such files. The minimal requirements for server 200 enable conventional, inexpensive dumb servers to be used.

The operation of an exemplary embodiment is described with reference to FIG. 3. First, active file 208 to be updated is selected 300 as the Original_State. Then, the most recent version available on server 200 is identified 302 by updater 210 as the Final_State. In the exemplary embodiment, Original_State is state 1.1 and Final_State is state 3.2. The hub version which can be created with original back-update file 206 is designated 304 the Original_Hub. In the exemplary embodiment, Original_Hub is state 1.0. Next, the most recent hub version available on server 200 is identified 306 by updater 210 as the Final_Hub. In the exemplary embodiment, Final_Hub is state 3.0. Ordinarily, the Final_Hub state will precede the Final_State in the sequence of states. Where Final_State is a hub state, however, they can be the same.

A test is performed 312 by updater 210 to determine whether Original_Hub and Final_Hub correspond to the same state. If they do, no hub updating is necessary. Otherwise, as in the exemplary embodiment, hub updating is necessary, and a hub incremental update 110 is retrieved 314 from server 200. The hub incremental update 110 retrieved is an incremental update for use in transforming a file of Original_Hub state to Final_Hub state. Hub incremental update 110 can be downloaded over a network, or it can be read from a removable medium, such as a magnetic or optical disk. Back-update file 206 is used by updater 210 to create 316 a file of the Original_Hub state from active file 208. Hub incremental update 110 is then used by updater 210 to transform 318 the file of the Original_Hub state to a file of the Final_Hub state.

After producing a file of Final_Hub state on local computer 204, a test is performed 320 by updater 210 to determine whether Final_Hub is the same state as Final_State. If so, no further updating is necessary to obtain the Final_State version. Otherwise, as in the exemplary embodiment, final incremental update 112 is retrieved 322 from server 200. Final incremental update 112 is an incremental update which can be used to transform a file from Final_Hub state to Final_State. After being retrieved, final incremental update 112 is used by updater 210 to create 324 a file of the Final_State from the file of the Final_Hub state.

Using the file of the Final_State and the file of the Final_Hub state, updater 210 creates 326 new back-update file 206 to replace the original back-update file 206. The creation of new back-update file 206 can be carried out in the same manner as the production of any of incremental updates 110, 112, using Final_State as the original state and Final_Hub as the destination state. In one embodiment updater 210 uses an incremental update builder such as the RTPatch "Build" program to create new back-update file 206. In other embodiments, any method for creating incremental updates can be used. After creation, new back-update file 206 is retained 326. Generally, retained new back-update file 206 will replace original back-update file 206. In one embodiment, new back-update file 206 is retained on a storage device which is internal to local computer 204. The file of the Final_State is retained 328 as well, becoming the new active file 208. Back-update file 206 and the file of the Final_State can be retained by, for example, writing them to a local storage device where they will be accessible after updater 210 is finished executing. All other intermediate files and incremental updates can be deleted to save storage space.

For clarity, in the exemplary embodiment described above, Final_State and Final_Hub are explicitly identified by updater 210. In an alternate embodiment, each hub incremental update 110 is packaged with final incremental update 112 on server 200. Each package is identified as corresponding to the Original_Hub state to which the included hub incremental update 110 applies. Rather than explicitly determining what the Final_Hub and Final_State are, updater 210 requests the package identified as being for Original_Hub state, extracts the included incremental updates, and applies them to Original_Hub. If Original_Hub is the same as Final_Hub, the package does not contain a hub incremental update 110, and if the Final_Hub is the Final_State, no final incremental update 112 is included. In this embodiment, updater 210 does not explicitly determine whether Original_Hub is the same as Final_Hub, or whether Final_Hub is the same as Final_State. For simplicity, only one package needs to be retrieved, and communication between updater 210 and server 200 is minimized. Suitable methods for packaging the files together are known in the art, and include the Java Archive (GAR) platform-independent file format, available from Sun Microsystems.

The system described permits updating from a small number of incremental updates retrieved from a dumb server without requiring the storage of a large number of incremental update files on the server. The trade-off for the lower amount of information sent over the network and the lower amount of information stored on the update server is that a slightly larger amount of information is stored on each user's local computer. The use of the system described, in which only back-update file 206 and active file 208 are retained on local computer 204, requires a relatively small amount of local storage space. The system described can be implemented as a computer program stored on a computer-readable medium.

The above description is included to illustrate the operation of exemplary embodiments and is not meant to limit the scope of the invention. The scope of the invention is to be limited only by the following claims. From the above description, many variations will be apparent to one skilled in the art that would be encompassed by the spirit and scope of the present invention.

What is claimed is:

1. A method for updating a computer readable file from an original state to a final state, the original state residing on a computer system, the original state and the final state being states within an ordered sequence of states, the final state being later in the sequence than the original state, and the sequence including a final hub state which is not preceded in the sequence by the final state, the method comprising:

using an original back-update and the original state to produce an original hub state;

responsive to the original hub state not being the final hub state; wherein at least one intermediate state is between the original hub state and the final hub state:

using a hub incremental update and the original hub state to produce a final hub state without using any intermediate states; and responsive to the final hub state not being the final state:

using a final incremental update and the computer readable file of the final hub state to produce a final state;

retaining the final state;

producing a final back-update for producing the final hub state from the final state; and retaining the final back-update.

2. The method of claim 1 wherein the sequence includes at least one state which is not a hub state.

3. The method of claim 1, wherein producing a final back-update comprises using the final state and the final hub state to produce a final back-update containing information about differences between the final state and the final hub state.

4. The method of claim 1, wherein using the original back-update further comprises accessing the original back-update from a locally accessible storage location, and retaining the final back-update comprises retaining the final back-update in the locally accessible storage location.

5. The method of claim 4, wherein the locally accessible storage location is a storage device accessible through a computer network.

6. The method of claim 4, wherein the locally accessible storage location is a storage device which is local to the computer system.

7. The method of claim 6, wherein the storage device is internal to the computer system.

8. The method of claim 6, wherein the storage device is a removable computer readable storage medium.

9. The method of claim 1, wherein using a hub incremental update further comprises accessing the hub incremental update over a computer network, and using a final incremental update further comprises accessing the final incremental update over the computer network.

10. The method of claim 1, wherein the original hub state is the latest hub state in the sequence which is not preceded in the sequence by the original state.

11. The method of claim 1, wherein the final hub state is the latest hub state in the sequence which is not preceded in the sequence by the final state.

12. The method of claim 1, wherein retaining the final state comprises replacing the original state with the final state.

13. The method of claim 1, wherein the sequence of states is a temporal sequence, and each state is associated with a position in time.

14. The method of claim 1, wherein there is only one hub state in the sequence, and the hub state is not preceded in the sequence by the original state.

* * * * *